(12) United States Patent
Takeyama

(10) Patent No.: US 6,888,087 B2
(45) Date of Patent: May 3, 2005

(54) WIRE ELECTRIC DISCHARGE MACHINE

(75) Inventor: Naotake Takeyama, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 55 days.

(21) Appl. No.: 10/662,305

(22) Filed: Sep. 16, 2003

(65) Prior Publication Data

US 2004/0060907 A1 Apr. 1, 2004

(30) Foreign Application Priority Data

Sep. 30, 2002 (JP) .......................................... 2002-287096

(51) Int. Cl.$^7$ ................................................ B23K 1/00
(52) U.S. Cl. ................................. 219/69.12; 219/69.11; 219/69.15
(58) Field of Search .......................... 219/69.12, 69.11, 219/69.15

(56) References Cited

U.S. PATENT DOCUMENTS

| | | | | |
|---|---|---|---|---|
| 4,383,160 A | * | 5/1983 | Obara | 219/69.12 |
| 5,077,457 A | * | 12/1991 | Onaka et al. | 219/69.12 |
| 6,698,639 B1 | * | 3/2004 | Otomo et al. | 226/97.4 |
| 6,787,727 B2 | * | 9/2004 | Yamada et al. | 219/69.12 |

FOREIGN PATENT DOCUMENTS

| | | | | |
|---|---|---|---|---|
| JP | 3013904 B2 | * | 2/2000 | B23H/7/10 |
| JP | 2002-028825 | | 1/2002 | |
| JP | 2002-126951 | | 5/2002 | |
| JP | 2002-137124 | | 5/2002 | |

* cited by examiner

Primary Examiner—M. Alexandra Elve
(74) Attorney, Agent, or Firm—Staas & Halsey LLP

(57) ABSTRACT

Automated wire connection is performed, and when the wire connection succeeds, the wire feed rate during the next connection is set to a value one stage faster. On the other hand, when connection fails the wire feed rate is set to a value one stage slower.

10 Claims, 6 Drawing Sheets

|  | ROUGHING | FINISH MACHINING |
|---|---|---|
| SHAPE 1 | CONNECTION 1 | CONNECTION 5 |
| SHAPE 2 | CONNECTION 2 | CONNECTION 6 |
| SHAPE 3 | CONNECTION 3 | CONNECTION 7 |
| SHAPE 4 | CONNECTION 4 | CONNECTION 8 |

WIRE ELECTRIC DISCHARGE MACHINE

BACKGROUND OF THE INVENTION

1. Field of the Invention

This invention relates to wire electric discharge machine, and in particular to wire electric discharge machine comprising an automated wire connection device.

2. Description of the Related Art

In wire electric discharge machine which comprises an automatic wire connection device, and which uses the automatic wire connection device to automatically pass a wire electrode through a through-hole which is a machining initiation hole in the workpiece, and to automatically connect the wire electrode, the success rate and operation time of wire connection by the automated wire connection device greatly affect the efficiency of wire electric discharge machining operations. Hence methods have been proposed in which, by setting the thickness of the workpiece for machining, the diameter and material of the wire electrode and other conditions, and selecting the wire feed rate during wire connection to be a speed suited to these conditions, the time for automated wire connection operations can be shortened, and in the event of failure of wire connection, the wire feed rate can be reduced to reliably perform wire connection (for example, Japanese Patent Application Laid-open No. 2002-126951).

In addition, methods which improve the efficiency of the automated wire connection operation are known, such that, when performing automated wire connection, either a first mode in which the nozzle of an upper wire-guide device is brought into contact with the workpiece for machining or a second mode in which the nozzle is located apart from the workpiece is set; and if the first mode is applied, a wire feed rate is selected which gives priority to shortening the wire connection time, and wire connection is performed, and if the second mode is applied, a wire feed rate is selected which gives priority to the success rate of wire connection, and wire connection is performed (for example, see Japanese Patent Application Laid-open No. 2002-137124).

In addition, methods are known which, when wire connection fails, switch the wire feed rate to a slower rate when again performing wire connection, to improve the connection success rate (for example, see Japanese Patent Application Laid-open No. 2002-28825).

As described above, in the prior art the wire feed rate during wire connection is determined according to the conditions set, and by reducing the wire feed rate when wire connection fails and again attempting wire connection, to shorten the time for wire connection operations while also increasing the success rate of wire connection, the efficiency of wire connection operations using an automated connection device can be improved.

In wire discharge machining, there are cases in which a single workpiece is machined into a plurality of machining shapes, and in order to perform machining a wire must be passed through a wire through-hole, which is a machining initiation hole, provided for each machining shape.

Further, when performing discharge machining a number of times on the same machining shape as in roughing and finish machining, after performing roughing of the same machining shape, normally there are few cases in which finish machining is immediately performed; usually, after performing roughing into a machining shape of all workpieces, finish machining is performed one or more times for each machining shape in sequence. In this case, each time roughing and finish machining is performed for each machining shape, the wire connection operation, in which a wire electrode is passed through a through-hole, must be performed.

In such cases, the fraction of the total wire electric discharge machining operation accounted for by wire connection operations increases, and so there is a need to improve the efficiency of these operations.

SUMMARY OF THE INVENTION

A first aspect of wire electric discharge equipment of this invention comprises an automated connection device which automatically performs connection processing of the wire electrode with respect to a wire through-hole and judges whether the automated wire connection is successful or not, and means for increasing by a prescribed amount the wire feed rate in the next operation when the previous wire connection by automated connection has been successful, and for causing automated connection to be performed.

This aspect can take the following embodiments.

The amount of increase of the wire feed rate is adjusted according to the result of the judgment as to whether automated wire connection has been successful or not in a plurality of previous attempts.

The amount of increase of the wire feed rate is made to differ depending on whether the next connection position is the same as, or different from, the previous connection position.

When the previous judgment result indicates that wire connection has failed, the wire feed rate in the next wire connection attempt is reduced.

The amount of this reduction of the wire feed rate is adjusted according to the result of judgment as to whether automated wire connection has been successful in a plurality of previous attempts.

The amount of this reduction of the wire feed rate is made to differ depending on whether the next connection position is the same as, or different from, the previous connection position.

A second aspect of wire electric discharge equipment of this invention comprises an automated connection device which automatically performs connection processing of the wire electrode with respect to a wire through-hole and judges whether the automated wire connection is successful or not; storage means for storing wire feed rate information during wire connection at a through-hole and wire connection judgment results information in correspondence with through-hole position information; and means for increasing the wire feed rate during the next wire connection attempt when the previous judgment result for the same through-hole indicates successful wire connection.

This aspect can take the following embodiments.

The amount of increase of the wire feed rate is adjusted according to the result of the judgment as to whether automated wire connection has been successful or not in a plurality of previous attempts, stored by the storage means.

When the previous judgment result indicates that wire connection has failed, the wire feed rate in the next wire connection attempt is reduced.

The amount of this reduction of the wire feed rate is adjusted according to the result of judgment as to whether automated wire connection has been successful or not in a plurality of previous attempts.

This invention comprises the above configurations, and so enables improved efficiency of wire connection operations particularly when machining a single workpiece in a plurality of machining shapes.

BRIEF DESCRIPTION OF THE DRAWINGS

The above-described and other objects and features of this invention will be clear from explanations of working examples given below, referring to the following drawings.

DESCRIPTION OF THE PREFERRED EMBODIMENTS

Figure 1:
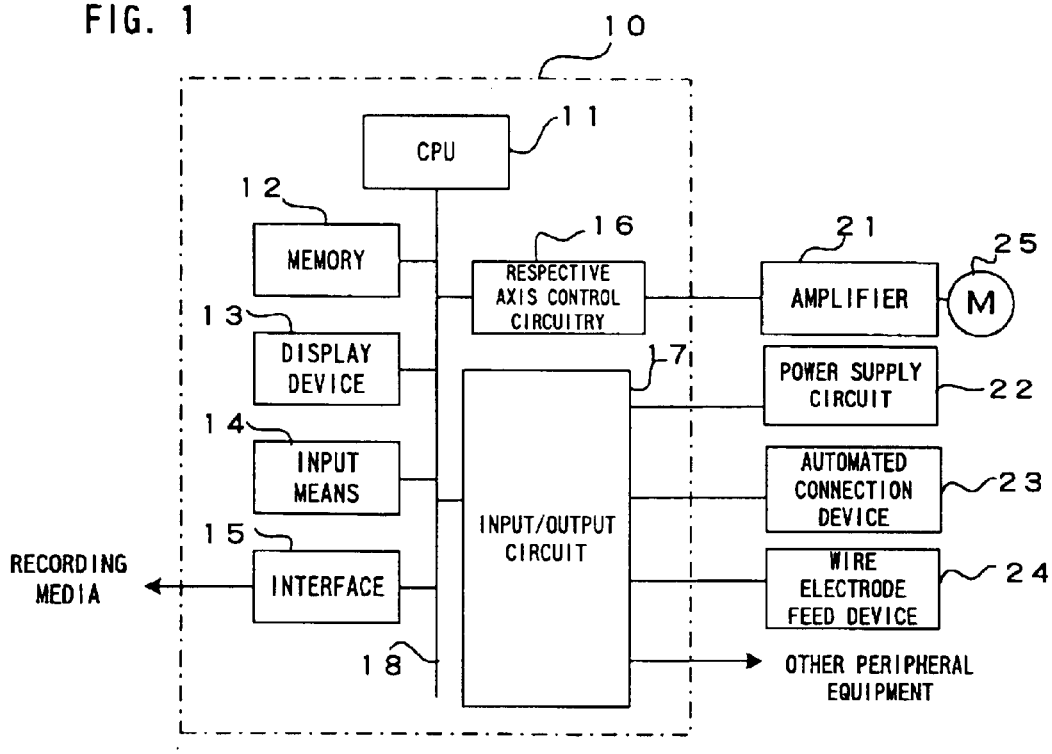
FIG. 1 is a block diagram of main portions of the wire electric discharge equipment according to an aspect of this invention.

FIG. 1 is a block diagram of main portions of the wire electric discharge equipment according to an aspect of this invention, and is centered on a control unit 10 comprising a numerical control device or similar which controls the wire electric discharge equipment. This control unit 10 comprises a processor 11, memory 12 constituted by ROM or RAM, a display device 13, a keyboard or other input means 14, an interface 15 to input or output a machining program or similar from external storage media, respective axis control circuitry 16 for each axis, an input/output circuit 17, and similar, connected to the processor 11 via a bus 18.

The respective axis control circuitry 16 controls motors which respectively drive the X axis and Y axis which drive a table on which the workpiece is placed in the orthogonal X and Y axes directions, a Z axis which moves an upper guide in the direction orthogonal to the X and Y axes, and orthogonal U and V axes used for taper machining. Further, the respective axis control circuitry 16 comprises feedback control means or similar to feed back the position, speed, and current for each of the axes (X, Y, Z, U, V).

Each of the respective axis control circuitry 16 is connected to the axis servo motor 25 via the servo amplifier 21 for the respective axes. A position/speed detector is installed in each servo motor, configured to feed back the position and speed to the respective axis control circuitry 16; however, this is omitted in FIG. 1.

The input/output circuit 17 is connected to a power supply circuit 22 to apply a voltage to the workpiece of the wire electric discharge equipment and cause discharge, to an automated connection device 23 to pass a wire electrode through a through-hole which is a machining initiation hole in the workpiece, to a wire electrode feed device 24 to feed the wire electrode, and to other peripheral equipment.

The above-described configuration of wire electric discharge equipment is not different from the configuration of conventional well-known wire electric discharge equipment. This invention utilizes the hardware of conventional electric discharge equipment to add new functions.

Figure 2:
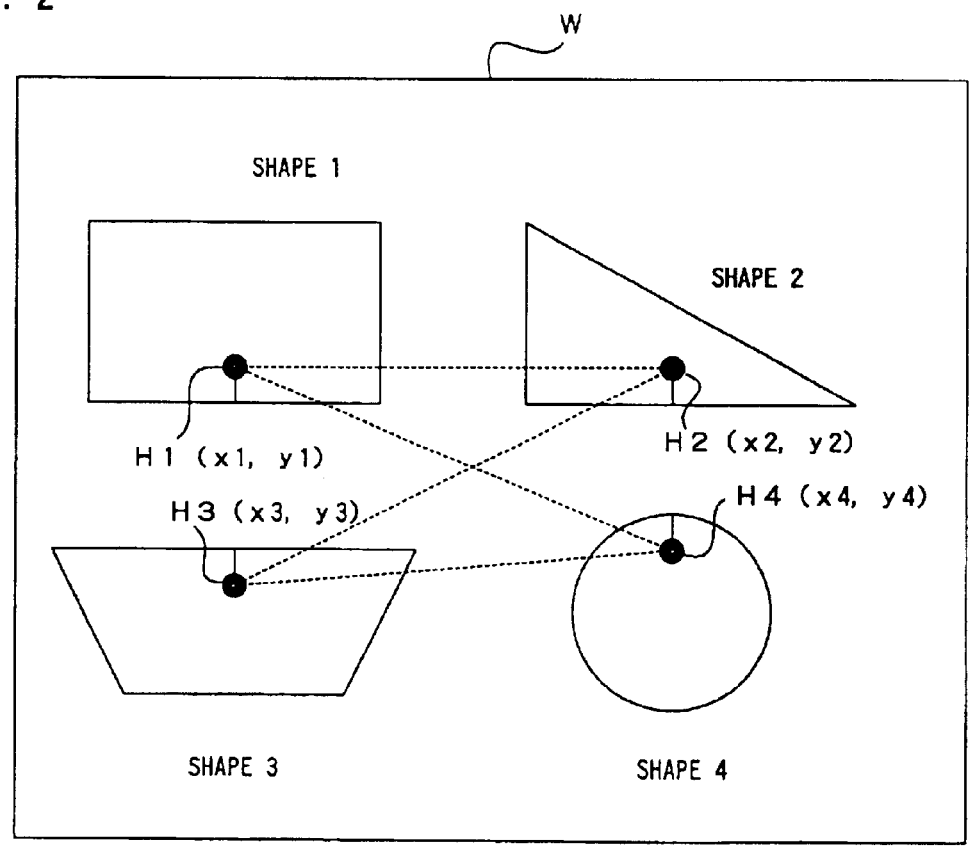
FIG. 2 is a drawing which explains examples of wire electric discharge machining.

FIG. 2 is an explanatory diagram of examples of machining of a workpiece W into a plurality of machining shapes using such wire electric discharge machine. In this example, the workpiece W is machined into the shapes, as seen from above the workpiece W (in the XY plane), of a rectangular machined shape 1, a triangular machined shape 2, a trapezoidal machined shape 3, and a circular machined shape 4. The solid lines shown in FIG. 2 indicate cutting positions machined by electric discharge machining; the dashed lines signify routes of fast-feed relative motion of the upper and lower guide positions (wire electrode position) with respect to the workpiece W.

In each of the machining shapes 1, 2, 3, 4, through-holes H1, H2, H3, H4, through which the wire electrode is passed at the start of machining, are formed in the XY plane at coordinates (x1,y1), (x2,y2), (x3,y3), (x4,y4).

Figures 3, 4:
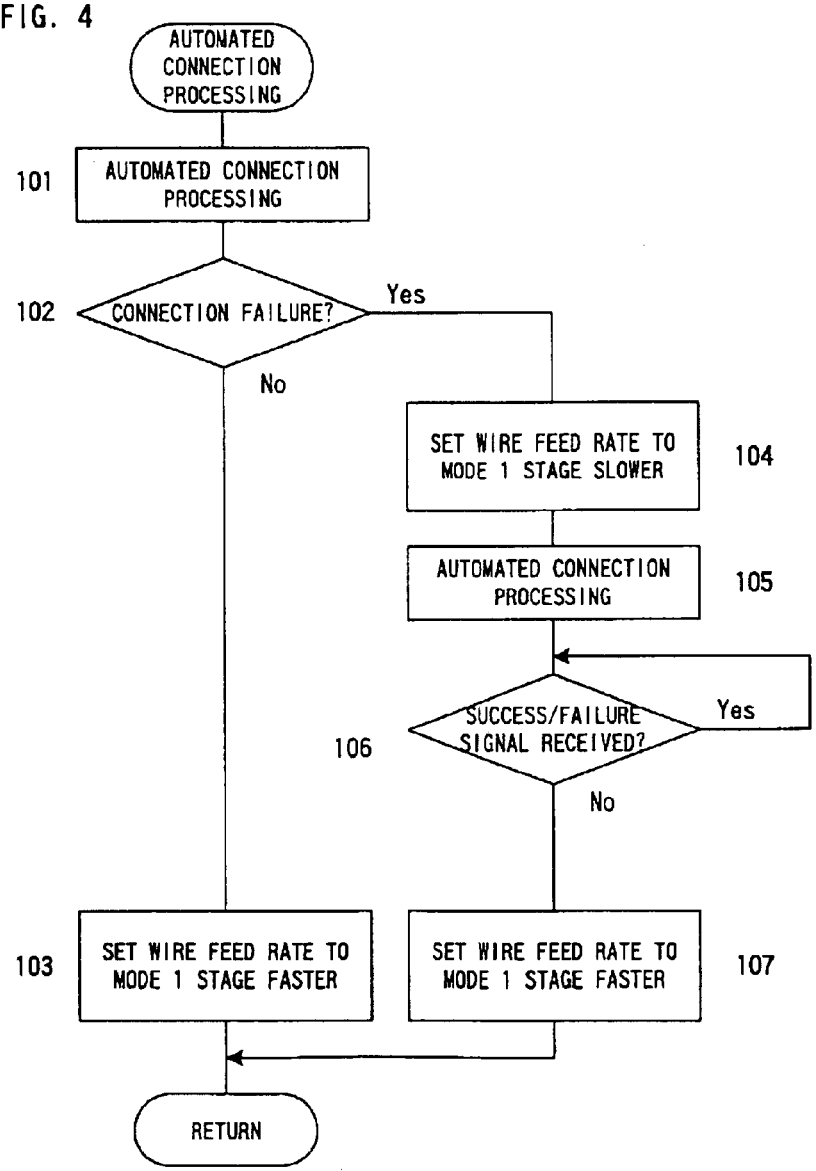
FIG. 3 is an explanatory diagram showing an example of the order of machining and the order of connection in the wire electric discharge machining shown in FIG. 2.
FIG. 4 is a flowchart of automated connection processing in a first embodiment of the invention.

FIG. 3 is an explanatory diagram showing an example of the order of machining into each shape shown in FIG. 2. It is assumed that a machining program has been created in which, first, roughing into the machining shapes from 1 to 4 is performed in order, and then finish machining is performed in order from machining shape 1 to machining shape 4.

In this case, first the automated connection device 23 moves the workpiece by fast-feeding to and positioned at the position (x1,y1) of the through-hole H1, which is the machining initiation hole for the machining shape 1, in order to pass the wire electrode through the hole; the position (x1,y1) is made to face the upper and lower guides, and the wire electrode is automatically connected. After the completion of connection, roughing of the machining shape 1 by wire electric discharge machining is performed. When roughing of this shape ends, wire-breaking is performed, and the workpiece W is moved by fast-feed to the position (x2,y2) of the through-hole H2 of the next machining shape 2, and is positioned such that this position faces the upper and lower guides. Then automated connection through the through-hole H2 for this machining shape 2 is performed, and roughing of the machining shape 2 is performed. Similarly thereafter, positioning at the positions of the through-holes H3 and H4 for the other machining shapes and automated connection are performed, and roughing operations are performed automatically. When roughing of all the machining shapes ends, positioning at the positions of the through-holes H1, H2, H3, H4 for each of the machining shapes and automated wire electrode connection are again performed in order to perform finish machining in order from machining shape 1; the operations of finish machining, wire-breaking, and positioning at the through-hole of the next machining shape are repeated.

First Embodiment

FIG. 4 is a flowchart of processing in a first embodiment of the invention, executed by the processor 11 of the control device 10 when an automated connection instruction is read from a machining program. The processor 11 reads a machining program stored in memory 12 and executes the program sequentially. Below, the machining shown in FIG. 2 is explained for an example of programming so as to perform machining in the machining order shown in FIG. 3.

First, in order to machine the workpiece into machined shape 1, the workpiece W is moved and positioned such that the position (x1,y1) of the through-hole H1, which is the machining initiation hole for the machining shape to be machined, faces the upper and lower guides. Next, an automated connection instruction is read from the machining program, and so the processor 11 outputs an automated connection instruction to the automated connection device 23, and also performs driving control of the wire electrode feed device 24 so as to supply the wire electrode at an initially set wire feed rate (step 101).

The automated connection device 23 executes automated connection processing similarly to the prior art, and transmits information relating to the connection result (a connection success/failure signal) to the control device 10. If the processor 11 judges that the connection success/failure signal sent from the automated connection device 23 indicates successful connection (step 102), the wire feed rate for the next automated connection via a through-hole is updated and set to a wire feed rate faster by a prescribed amount than the current wire feed rate (step 103).

On the other hand, the processor 11, on judging that the connection success/failure signal indicates connection failure, updates and sets the wire feed rate for the next automated connection via a through-hole to a wire feed rate slower by a prescribed amount than the current wire feed rate (step 104). The wire electrode feed device 24 is driven at this wire feed rate, and an automated connection instruction is outputted to the automated connection device 23 (step 105). The automated connection device 23 executes automated connection processing at a wire feed rate slower by the prescribed amount than in the previous processing, and transmits a connection success/failure signal to the control device 10. When the connection success/failure signal is sent (step 106), the processor 11 increases the wire feed rate by the prescribed amount, returning to the original wire feed rate (step 107).

On having outputted a connection instruction a set number of times to the automated connection device 23 and having received a connection failure signal a set number of times, the processor 11 of the control device 10 judges that wire connection via the through-hole H is impossible, and does not perform machining of the shape, but positions the workpiece W at the through-hole position for the next machining shape.

In the first embodiment shown in FIG. 4, it is assumed that the cause of the failure at a through-hole at which wire connection fails is not likely to apply to the cases of wire connection at other through-holes, and so the wire feed rate is returned to the original wire feed rate regardless of whether automated connection results for a plurality of automated connection instructions indicate connection successes or connection failures. However, when it is conceivable that the cause of failure at a through-hole at which connection is failed is applicable to the cases of wire connection at other through-holes also, a method may be employed in which the wire feed rate is returned to the original rate when automated connection has succeeded, but when connection has failed the rate is not returned to the original wire feed rate, and during the next automated connection, automated connection is performed at a wire feed rate which is one stage slower (slower by a prescribed amount). In this case, in step 106 connection success or failure is judged, and if success is judged, execution proceeds to step 107, but if failure is judged, the automated connection processing ends without performing the processing of step 107, and execution returns to the main program.

In this way, if automated connection of the wire at a given through-hole succeeds once, during automated connection at the next through-hole H the wire feed rate is made faster by one stage (prescribed amount), so that the automated connection time can be shortened.

Second Embodiment

Figure 5:
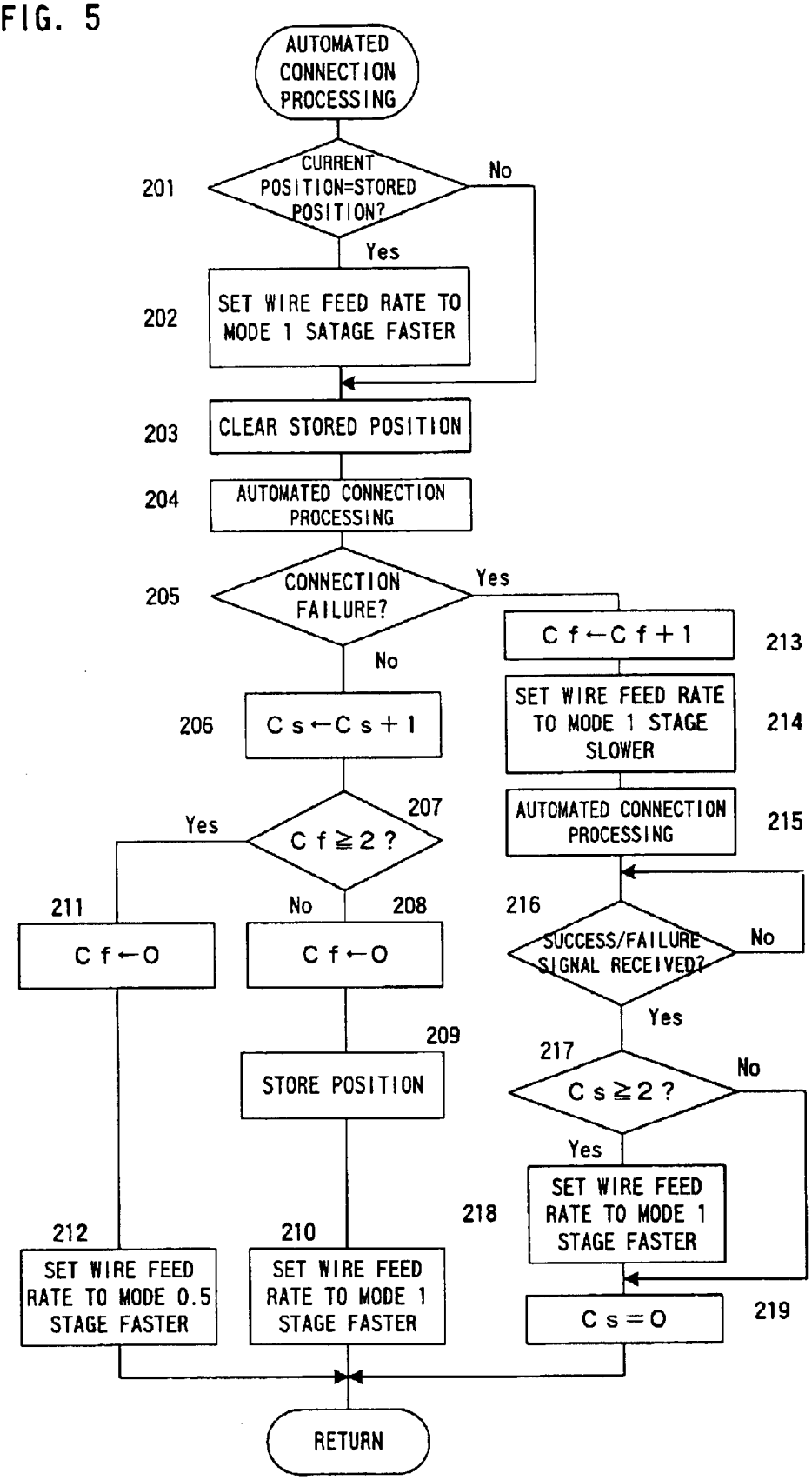
FIG. 5 is a flowchart of automated connection processing in a second embodiment of the invention.

FIG. 5 is a flowchart of processing in a second embodiment of this invention, executed by the processor 11 of the control device 10. In this second embodiment, when connection is performed at the same position as the previous connection position, that is, when the same shape is machined two times in succession, the wire feed rate is further increased to perform connection for the second machining, and the wire feed rate during automated connection is decided according to past connection successes and failures.

On reading an automated connection instruction from the machining program, the processor 11 judges whether the current position (X and Y axis coordinates) coincides with a stored position or not (step 201), and if there is no coincidence, clears the stored position (step 203), outputs an automated connection instruction to the automated connection device 23, and drives the wire electrode feed device 24 at the currently set wire feed rate (step 204). The processor 11 then judges whether a connection success/failure signal has been inputted from the automated connection device 23 or not (step 205), and if the signal indicates connection success, adds 1 to a counter Cs which counts the number of consecutive successes (step 206). This counter Cs, and a counter Cf described below which counts the number of consecutive connection failures, are each set to "0" as initial settings when the power is turned on.

Next, a judgment is made as to whether the value of the counter Cf which counts the number of consecutive connection failures is equal to or greater than a preset value (in FIG. 5, the preset value is "2") (step 207); if less than the preset value "2", the counter Cf is cleared (step 208), the position of the through-hole (X and Y axis coordinates) is stored (step 209), and the wire feed rate setting is raised one stage. That is, the rate is set to a value faster by a prescribed amount (step 210), and execution returns to the main program.

When automated connection is successful, and moreover the number of consecutive failures which is the value of the counter Cf is less than the preset value "2", the current position is stored (step 209), and the wire feed rate for the next automated connection is set to one stage faster (step 210).

In order to execute the next automated connection, the workpiece W is positioned at the next through-hole position, and on reading an automated connection instruction from the program, the processor 11 judges whether the stored position coincides with the current position or not (step 201). If machining of the same shape is to be continued, the stored position and the current position coincide, and so the wire feed rate is set to one stage faster (step 202). In this case, the wire feed rate has already been set one stage faster in step 210, so that the rate is set two stages faster. If the number of consecutive failures which is the value of Cf is equal to or greater than the set value, or if connection succeeds in a state where connection failure had once occurred and the wire feed rate has been set one stage slower, the current position is not stored (step 209 is not executed), and so even when machining of the same shape is continued, step 202 is not executed, so that the wire feed rate is not set one stage faster.

Subsequently, the processing of the previously described steps 203, 204 and 205 is performed; when a connection failure occurs, the counter Cf which stores the number of consecutive connection failures is incremented by 1 (step 213), the wire feed rate is set to one stage slower (reduced by a prescribed amount), and the wire electrode feed device 24 is driven at this rate; at the same time, an automated connection instruction is outputted (step 215), and a connection success/failure signal from the automated connection device 23 is awaited (step 216).

When a connection success/failure signal is inputted, a judgment is made as to whether the value of the counter Cs which counts the number of consecutive connection successes is equal to or greater than a set value (in FIG. 5, "2") or not (step 217), and if equal to or greater than the set value, the wire feed rate is set to one stage faster (step 218), but if the set value is not reached, the wire feed rate remains in the level as set one stage slower in step 214. After clearing the counter Cs (step 219), execution returns to the main program.

A method may also be employed in which, if in step 216 the connection success/failure signal indicates connection failure, execution proceeds to step 219, and if the connection is successful, execution proceeds to step 217; and when the value of the counter Cs is equal to or greater than the set value "2", in step 218 the wire feed rate is set to slightly faster than the first stage (for example, midway between the first stage and the second stage). In other words, the wire feed rate is increased by 1.5 times the prescribed value. By this means, from a wire feed rate set one stage slower in step 214, the rate is finally set to a half stage faster. In this case, if the value of the counter Cs has not reached the set value, the wire feed rate may be left at one stage slower as in step 214, or may be raised by one stage, returning the rate to the original rate.

Subsequently, the processing of the previously described steps beginning with 201 is performed each time an automated connection instruction is read from the machining program; if a connection failure occurs at the first connection instruction, and when a connection success occurs in a state where the value of the counter Cf which counts the number of connection failures has reached the set value (2) or higher, the value of the counter Cf is judged to be equal to or greater than the set value (2) in step 207, and so execution proceeds from step 207 to step 211 and the counter Cf is cleared, and in addition the wire feed rate is made faster by a half stage. That is, the wire feed rate is set to a rate increased by 0.5 times the prescribed amount (step 212).

In this second embodiment also, each time connection success occurs the wire feed rate during the next automated connection is increased by one stage (increased by the prescribed amount); however, when connection successes occur consecutively, the wire feed rate may be increased by greater than one stage. For example, in the next step after step 208 a judgment may be performed as to whether the value of the counter Cs which counts the number of connection successes is equal to or greater than the set value (for example, "2"), and if equal to or greater than the set value, the wire feed rate may be set to 1.5 stages faster.

Third Embodiment

Figure 6:
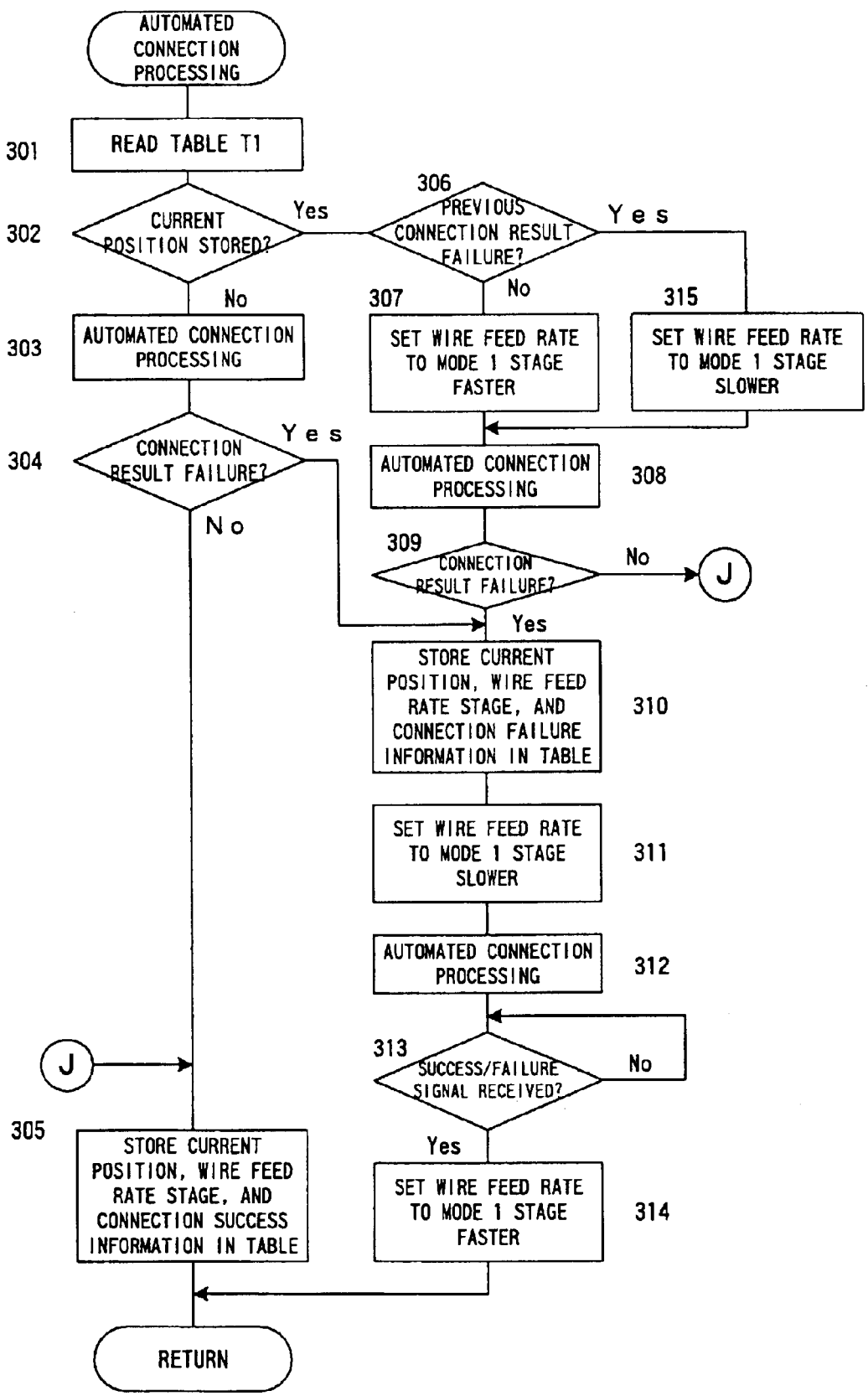
FIG. 6 is a flowchart of automated connection processing in a third embodiment of the invention.

FIG. 6 is a flowchart of automated connection processing in a third embodiment of the invention. In this third embodiment, as in the machining examples of FIG. 2 and FIG. 3, a case is considered in which a plurality of machining shapes are rough-machined in sequence, and then finish machining is performed; when a wire electrode is again passed through the same through-hole H and connected, if the wire connection succeeded the previous time, the wire electrode is fed at a wire feed rate faster than the previous wire feed rate.

Figure 8:
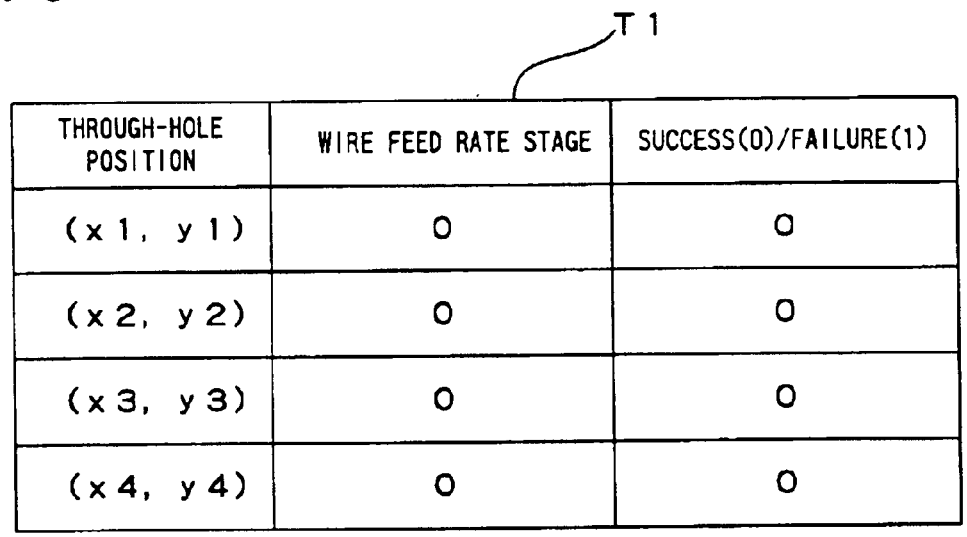
FIG. 8 is an explanatory diagram of a table used in the automated connection processing of FIG. 6; and, FIG. 9 is an explanatory diagram of a table used in the automated connection processing of FIG. 7.

In this case, as shown in FIG. 8, a table T1 which stores through-hole position information, wire feed rate stage information, and connection success/failure information, is provided in memory 12.

When the workpiece W is positioned at a through-hole position and an automated connection instruction is read from the machining program, the processor 11 initiates the processing of FIG. 6. First the table T1 is read, and a judgment is made as to whether or not the current position is stored in the through-hole positions of the table. If the current position is not stored, the wire electrode connection for the through-hole is the first connection, execution proceeds to step 303, and an automated connection instruction is outputted to the automated connection device 23; in addition, the wire electrode feed device 24 is driven at the initially set wire feed rate.

When the connection success/failure signal sent from the automated connection device 23 indicates successful connection (step 304), the position of the through-hole is stored in the table T1, and in addition the stage information for the wire feed rate during connection is stored, and an "0" indicating success is stored in the connection success/failure column. In this step 305, during processing performed when the wire electrode is initially passed through the through-hole and connected, current position information as well as an "0" indicating that the wire feed rate is the set value and an "0" indicating connection success are stored.

On the other hand, when the connection success/failure signal sent in step 304 indicates connection failure, execution proceeds to step 310, and current position information, an "0" indicating that the wire feed rate stage is the set value, and a "1" indicating connection failure, are stored in the table T1. In order to reduce the wire feed rate by one stage, the wire feed rate stage in the table T1 is set to a value decreased by 1 from the currently stored value (step 311). That is, the wire feed rate is slowed by one stage, and the wire electrode feed device 24 is driven at this wire feed rate; in addition, an automated connection instruction is outputted to the automated connection device 23 (step 312).

Execution waits until a connection success/failure signal is received from the automated connection device 23 (step 313), the wire feed rate stage information in the table T1 is incremented by 1, the rate is returned to the original rate (step 314), and execution returns to the main program. If the connection is successful, machining of the machining shape is performed; if the connection fails, no machining of the machined shape is performed, and positioning at the position of the next through-hole is performed.

In this way, when the wire electrode is initially passed through a through-hole and connected, the processing of steps 301 to 304 is performed, and if the connection is successful the processing of step 305 is performed, but if the connection is a failure the processing of steps 310 to 314 is performed, and execution returns to the main program. In a state in which automated connection processing has been performed once for all the through-holes, wire feed rate stage information and connection success/failure information are stored for the through-hole position information in the table T1. FIG. 8 shows an example in which there are four through-holes such as in FIG. 2.

When passing the wire electrode again through a through-hole and connecting the wire to perform finish machining as shown in FIG. 3, after connection processing has been performed once for all the through-holes, the processing of FIG. 6 is initiated according to an automated connection instruction, as the through-hole position has been stored in the table T1. When the table T1 is read, as through-hole position information coinciding with the current position is present, execution proceeds from steps 301 and 302 to step 306, success/failure information stored for the previous connections attempted at the through-hole position is read. If the previous connection was successful, the wire feed rate stage information is incremented by 1 and set (step 307). If the previous connection failed, on the other hand, the wire feed rate stage information is decremented by 1 and set (step 315). A value equal to the wire feed rate stage information value stored in the table T1 multiplied by a prescribed amount is added to the currently set wire feed rate, the result is used as the wire feed rate for the current automated connection. And, the wire electrode feed device 24 is driven, and a connection instruction is outputted to the automated connection device 23 (step 308). As a result, if the previous connection attempt was successful the wire feed rate is increased by one stage (a prescribed amount), and if the previous connection attempt failed the rate is decreased by one stage (a prescribed amount).

If the connection success/failure signal sent from the automated connection device 23 indicates connection success (step 309), execution proceeds to step 305. If connection fails, on the other hand, execution proceeds to step 310. In this case, since the through-hole position has already been stored in the table T1, and moreover the wire feed rate stage information has been updated in step 307 or step 315, only the connection success information is overwritten in step 305. Further, only the connection failure information is overwritten in step 310. When connection failure occurs, the processing of the above-described steps 311 to 314 is performed, and execution returns to the main program.

In this way, when the wire electrode is passed through the same through-hole and connected, the wire feed rate is increased or decreased according to the success or failure of the previous connection attempt when performing connection processing, so that the time required for connection processing is shortened and the connection success rate can be improved.

Fourth Embodiment

Figure 7:
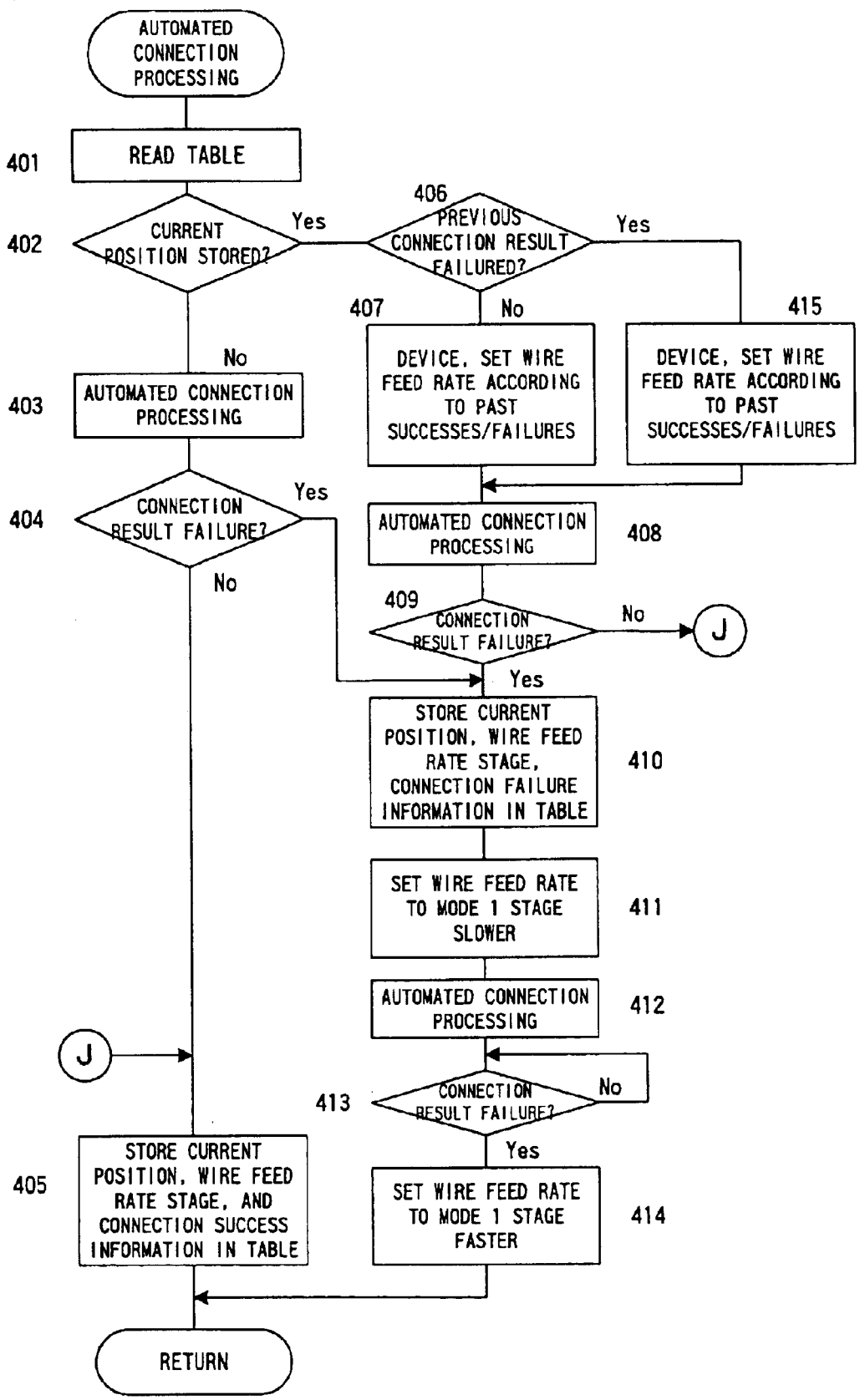
FIG. 7 is a flowchart of automated connection processing in a fourth embodiment of the invention.

FIG. 7 is a flowchart of automated connection processing in a fourth embodiment of the invention. This fourth embodiment is similar to the third embodiment shown in FIG. 6; when performing wire connection a plurality of times through the same through-hole, on performing connection the second and subsequent times, the wire feed rate is determined based on the success/failure results in the past plurality of connection attempts.

Figure 9:
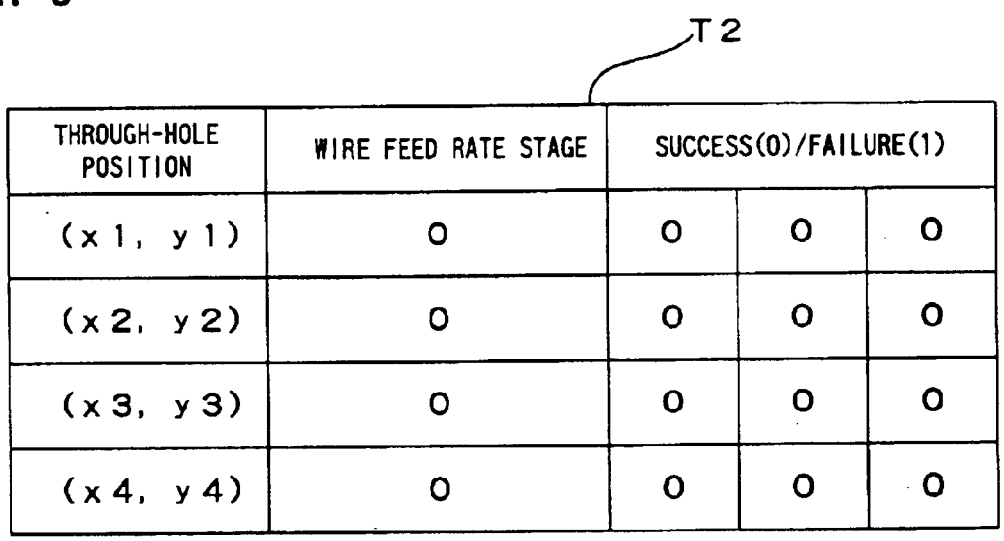

In the case of this fourth embodiment, a table T2 such as shown in FIG. 9 is provided in the memory 12. This table T2 differs from the table T1 used in the third embodiment in that information on connection successes and failures is divided into a plurality of past attempts. In the example shown in FIG. 9, connection success/failure information for the past three attempts can be stored; when a still greater number of connection attempts are performed for the same through-hole, the connection success/failure information columns in the table T2 are shifted, so that the connection success/failure information for the most recent three attempts is always stored.

In this fourth embodiment, the wire feed rate is decided based on connection success/failure information for the past three attempts, so that the processing in FIG. 7 and the processing in FIG. 6 differ only in that the steps 307 and 315 in FIG. 6 are the steps 407 and 415 in FIG. 7; otherwise the processing is the same. That is, the processing of steps 401 to 406 in FIG. 7 and the processing of steps 301 to 306 in FIG. 6 are the same, and the processing of steps 408 to 414 in FIG. 7 is the same as the processing of steps 308 to 314 in FIG. 6.

When wire connection is performed the second and subsequent times for the same through-hole, if the connection succeeded in the previous attempt, execution proceeds to steps 401, 402 and 407, and in step 407 the extent of increase of the wire feed rate is changed based on the past connection success/failure information. If connection successes continue, the amount of rate increase is made larger, and if failures continue, but the previous attempt was successful, the amount of wire feed rate increase is made small. For example, a weighting of 0.5 may be assigned to past connection successes, and the value obtained by adding 1 to the result of multiplying the number of successes in the past two or three connection attempts by 0.5 may be used as the current automated connection wire feed rate stage, without using information on success in the previous connection attempt.

For example, if two connection successes are stored for the past second and third attempts, then 1+0.5×2=2 is added to the currently stored wire feed stage information, and the result is set. And, if one connection success is stored for the past second and third attempts, then 1+0.5×1=1.5, or if no connection successes are stored for the past second and third attempts, then 1+0.5×0=1, is added to the wire feed rate stage information, and the result is set.

If the previous connection attempt results in connection failure, the processing of step 415 is performed, and the amount by which the wire feed rate is reduced is decided based on the past second and third connection success/failure information. Here a weighting of 0.5 is applied to past connection successes, for example, and the value resulting by subtracting 1 from the result of multiplying the past second and third connection successes by 0.5 is added to the currently stored wire feed rate stage information. If not even one connection success is stored as the past second or third connection attempt, "−1" is added; if one success is stored, 0.5×1−1=−0.5 is added; and if two connection successes are stored, 0.5×2−1=0 is added and the wire feed rate stage information is not changed.

Thus, after the wire feed rate stage information is updated in step 407 or step 415, the value obtained by multiplying this wire feed rate stage information by a prescribed amount is added to the initially set wire feed rate, and the result is used as a wire electrode feed rate during the current automated connection, and the wire electrode feed device 24 is driven at this wire feed rate; in addition, an automated connection instruction is outputted to the automated connection device 23, and automated connection operation is executed (step 408).

Subsequently, the processing of steps 409 to 414, which is identical to that of steps 309 to 314 in FIG. 6, is executed, and execution then returns to the main program.

Because in this invention the wire feed rate during automated connection is adjusted based on past automated connection success/failure information, the wire connection time can be shortened, and the connection success rate can be improved.

What is claimed is:

1. Wire electric discharge machine, comprising:
an automated connection device, which performs automated connection of a wire electrode with respect to a wire through-hole, and judges whether the wire automated connection has succeeded or not; and, means for increasing by a prescribed amount the wire feed rate during the next connection when the wire connection in the previous automated connection attempt has succeeded, and for causing automated connection to be performed.

2. The wire electric discharge machine according to claim 1, wherein the amount of increase of said wire feed rate is adjusted according to the result of judgment in a past plurality of wire connection attempts by said automated connection device.

3. The wire electric discharge machine according to claim 1, wherein the amount of increase of said wire feed rate is different according to whether the next connection position is the same position as, or a different position from, the previous wire connection position.

4. The wire electric discharge machine according to claim 1, wherein, when the previous judgment result is wire connection failure, the wire feed rate for the next wire connection attempt is decreased.

5. The wire electric discharge machine according to claim 4, wherein the amount of decrease of said wire feed rate is adjusted according to the result of judgment in a past plurality of wire connection attempts by said automated connection device.

6. The wire electric discharge machine according to claim 4, wherein the amount of decrease of said wire feed rate is different according to whether the next connection position is the same position as, or a different position from, the previous wire connection position.

7. Wire electric discharge machine, comprising:

an automated connection device, which performs automated connection of a wire electrode with respect to a wire through-hole, and judges whether the wire automated connection has succeeded;

storage means for storing wire feed rate information during wire connection at a through-hole and wire connection judgment result information, in correspondence with through-hole position information; and, means for increasing by a prescribed amount the wire feed rate during the next connection when the previous judgment result for the same through-hole indicates successful wire connection.

8. The wire electric discharge machine according to claim 7, wherein the amount of increase of said wire feed rate is adjusted according to the result of judgment in a past plurality of wire connection attempts by said automated connection device, stored in said storage means.

9. The wire electric discharge machine according to claim 7, wherein, when the previous judgment result is wire connection failure, the wire feed rate for the next wire connection attempt is decreased.

10. The wire electric discharge machine according to claim 9, wherein the amount of decrease of said wire feed rate is adjusted according to the result of judgment in a past plurality of wire connection attempts by said automated connection device.

* * * * *